United States Patent [19]

Robau

[11] Patent Number: 4,848,216
[45] Date of Patent: Jul. 18, 1989

[54] STEAM-HEATED MILK WARMER

[76] Inventor: Romarico P. Robau, 9662 SW. 18th Ter., Miami, Fla. 33165

[21] Appl. No.: 146,707

[22] Filed: Jan. 21, 1988

[51] Int. Cl.⁴ .................................................. A47J 43/00
[52] U.S. Cl. .................................. 99/323.3; 99/275; 99/447; 99/483; 126/369
[58] Field of Search ....................... 99/323.3, 447, 516, 99/281, 293, 275, 294, 295, 483; 126/19.5, 20, 369; 219/326, 439, 429–431, 474; 261/DIG. 10

[56] References Cited

U.S. PATENT DOCUMENTS

| | | | |
|---|---|---|---|
| 1,584,514 | 5/1926 | Deeter | 126/19.5 |
| 1,861,672 | 6/1932 | Whisner | 126/19.5 |
| 2,011,869 | 8/1935 | Pecker | 126/369 |
| 2,756,031 | 7/1956 | Sanstrom | 126/19.5 |
| 3,320,945 | 5/1967 | Dunkelman | 126/369 |
| 3,502,065 | 3/1970 | Lassiter | 126/369 |
| 3,962,962 | 6/1976 | Anderson | 99/483 |
| 4,137,833 | 2/1979 | Yelloz | 99/293 |
| 4,164,174 | 8/1979 | Wallstén | 99/415 |
| 4,261,328 | 4/1981 | Kirk | 99/440 |
| 4,373,511 | 2/1983 | Mules et al. | 99/447 |
| 4,557,187 | 12/1985 | DePonte | 99/279 |
| 4,565,121 | 1/1986 | Ohya et al. | 99/293 |
| 4,644,856 | 2/1987 | Borgmann | 99/295 |

FOREIGN PATENT DOCUMENTS 0112086 6/1984 European Pat. Off. ........... 99/323.3

Primary Examiner—Harvey C. Hornsby
Assistant Examiner—Joseph S. Machuga

[57] ABSTRACT

A milk warmer comprising an open tray for holding hot water and containers of milk, and a closed chamber under and contiguous with the tray, there being a common heat-conducting wall between the tray and the chamber. There is a first means for controllably introducing steam into the chamber; for example from a coffee-making machine. There is a second means for controllably transferring steam and condensate from the chamber into the tray and impinging the transferred steam against a shield attached inside the tray.

11 Claims, 2 Drawing Sheets

4,848,216

STEAM-HEATED MILK WARMER

BACKGROUND OF THE INVENTION

1. Field of the Invention

This invention relates to a novel steam-heated milk warmer that is adapted to be used with a coffee-making machine, and particularly to a device adapted to heat milk that is then added to a coffee extract made in the coffee-making machine to make cafe'-au-lait; that is, coffee with hot milk.

2. Description of the Prior Art

It is the practice in many places in the world to drink cafe'-au-lait; a beverage made by adding hot milk to the hot water extract of ground roasted coffee beans. A machine that is designed to prepare the hot coffee extract is described in U.S. Pat. No. 4,137,833 issued to R. P. Yelloz. This machine includes means for generating hot water and low pressure steam, and means for passing hot water through a quantity of coffee grounds to produce the coffee extract.

Since milk is normally kept cold, it is necessary to heat the milk before adding it to the hot coffee extract. This machine, as do other coffee-making machines, includes a means for tapping off low-pressure steam, which steam is passed directly into a quantity of milk. This method rapidly heats the milk, but it also dilutes the milk with condensate from the steam, which alters the flavor of the beverage in an undesirable way. Also this method is hazardous if the release of steam is not properly controlled. Another disadvantage is that this prior method is relatively slow because, for proper control, each quantity of milk must be separately heated by an operator who must manually tend the valve that feeds steam into the milk. Each of these disadvantages is especially undesirable when the beverage is prepared for service in a busy restaurant.

OBJECTS OF THE INVENTION

An object of this invention is to provide a novel steam-heated milk warmer.

Another obect is to provide a novel device for heating milk to be used in preparing cafe'-au-lait.

A further object is to provide a novel steam-heated device for warming milk which does not dilute the milk with steam condensate.

A still further object is to provide a novel device of the type described which avoids the hazards of manually releasing low-pressure steam.

Still another object is to provide a novel device of the type described which does not require the operator to manually tend the steam control valve while a quantity of milk is being heated.

SUMMARY OF THE INVENTION

The novel device for warming milk comprises an open tray for holding hot water and containers of milk. The tray has a heat-conducting bottom wall, side walls and a shield attached to the inside of one of the side walls. There is a closed chamber under of and contiguous with the tray, there being a common heat-conducting wall between the tray and the chamber. There is a first means for controllably introducing low-pressure steam into the chamber and a second means for controllably transferring steam and condensate from the chamber into the tray and impinging the transferred steam against the shield.

In operation, low-pressure steam is drawn from a coffee-making machine and controllably passed through the chamber which heats the bottom wall of the tray and its contents (hot water and milk containers). Steam and condensate bled out of the chamber impinges on the shield and the condensate drains into the tray. Thereby, steam drawn from the coffee-making machine heats the milk without diluting it without condensate. The machine may be allowed to run continuously without tending since steam only bleeds through the second means and is continuously controlled. Smaller or larger quantities of hot milk may be prepared depending on demand with the novel device, which is completely compatible for use with, and connection to, a machine for producing hot coffee extract from ground coffee beans.

DETAILED DESCRIPTION OF THE INVENTION INCLUDING THE PREFERRED EMBODIMENTS

Figure 1:
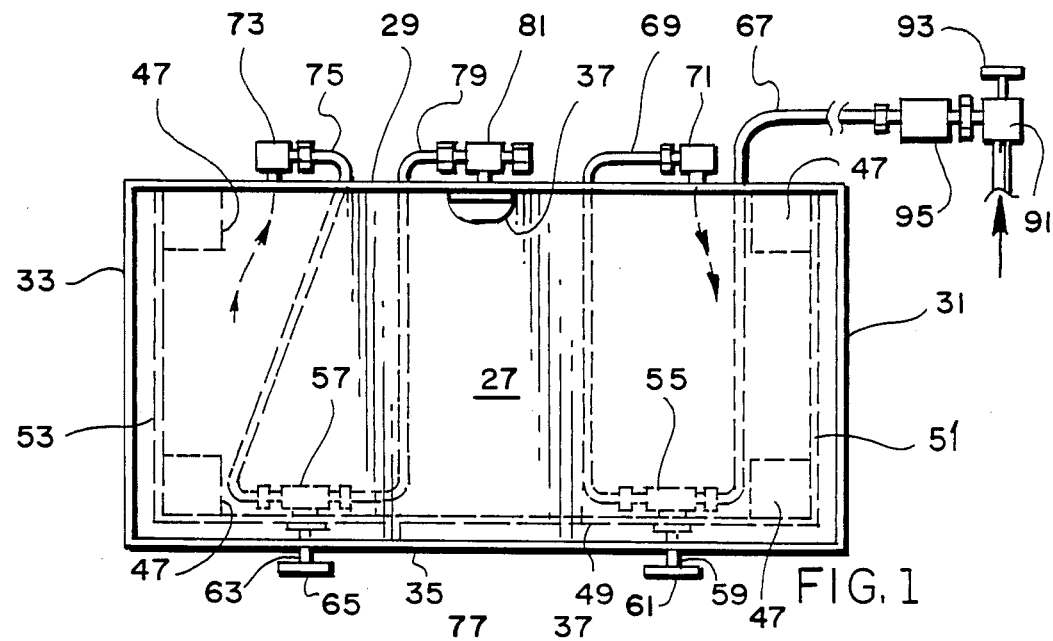
FIGS. 1, 2 and 3 are, respectively, plan, front and back views of a preferred embodiment of the novel device.
Figure 2:
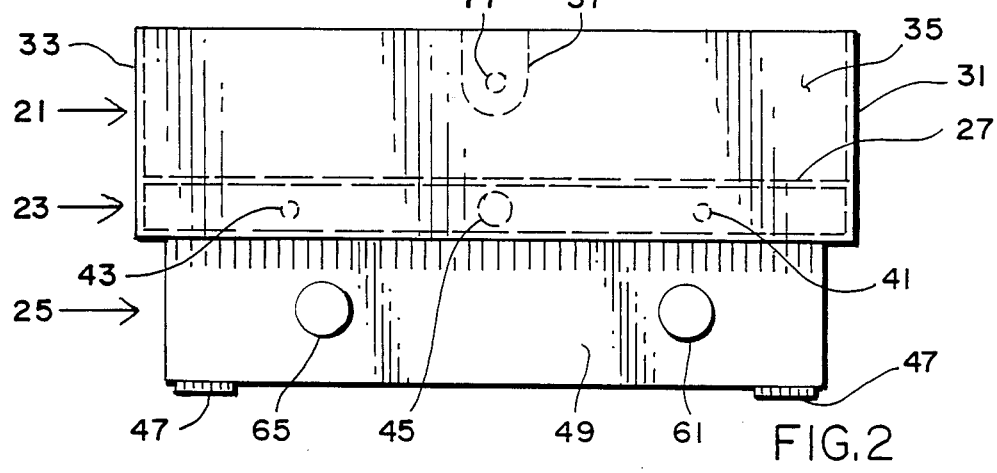

The following description of some of the embodiments of the concepts of this invention is made in reference to the accompanying figures. Where an individual structural element is depicted in more than one figure, it is assigned a common reference numeral for simplification of identification and understanding.

The preferred embodiment shown in FIGS. 1 to 4 includes an open tray 21, a closed chamber 23 under the tray 21, and a pedestal 25 under the chamber 23 assembled and joined together as a single integral unit. The tray 21, chamber 23 and pedestal 25 are preferably made of a corrosion-resistant metal alloy such as brass, bronze or stainless steel. Other alloys, metals and/or non-metals may be used which suit the performance requirements of these parts.

The tray 21 includes a bottom wall 27 of a heat-conducting material, a back wall 29 two side walls 31 and 33, and a front wall 35 all joined together to provide a water tight basin. The tray 21 includes a shield 37 which is attached along the upper margin of, and at about the center of the inside surface of the back wall 29. The shield 37 extends downwardly in spaced relation with the inside surface of the back wall 29. The tray is substantially rectangular, being about $12\frac{5}{8}$ inches wide, $6\frac{1}{2}$ inches deep and $2\frac{3}{8}$ inches high.

Figure 3:
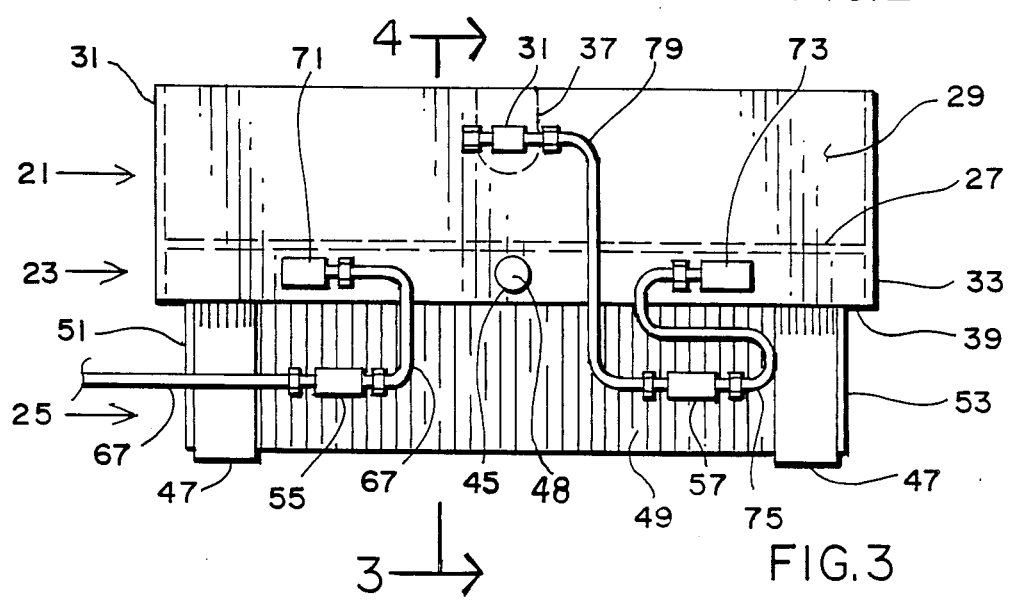
Figure 4:
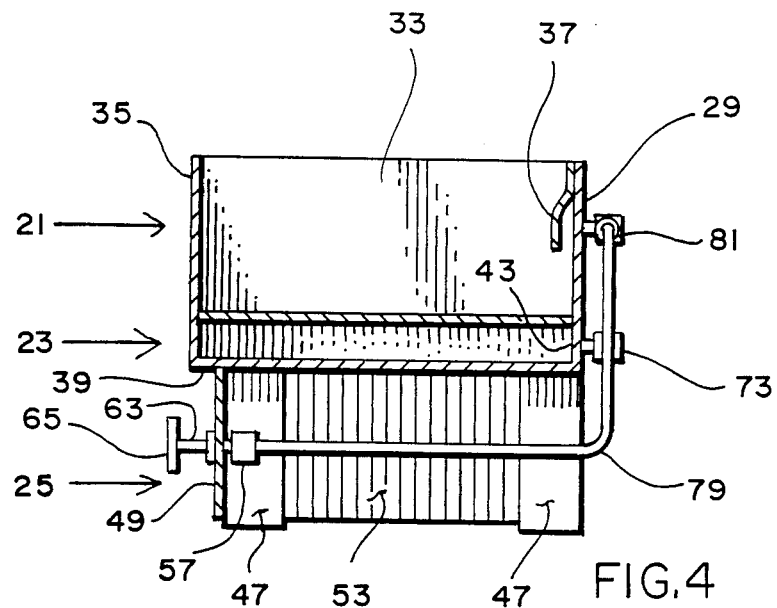
FIG. 4 is a sectional view of the preferred embodiment viewed along section line 4—4 in FIG. 3.

The chamber 23 is defined by a base wall 39, extensions of the back, side and front wall 29, 31, 33 and 35 which join the base wall 39 at its perimeter and the bottom wall 27 which is common to the tray 21 and the chamber 23. The chamber 23 is tight to low-pressure steam except for an inlet opening 41, an outlet opening 43 and a cleanout opening 45 in th back wall 29 of the chamber 23. The cleanout opening 45 is normally sealed with a removable plug 48 (FIG. 3).

The basewall 39, and therefore the tray 21 and the chamber 23, rests on the pedestal 25. The pedestal 25 includes four legs 47 made of one-inch square tubing in a rectangular array slightly smaller than the width and depth of the tray 21. The legs 47 are joined together by a front skirt 49 and side skirts 51 and 53. The legs 47 are about 2¾ inches high.

An inlet control valve 55 is mounted in a first hole in the front skirt 49 and an outlet control valve 57 is mounted in a second hole in the front skirt 49. The inlet control valve 55 includes an inlet valve stem 59 and an inlet control knob 61. The outlet control valve 57 includes an outlet valve stem 63 and an outlet control knob 65.

The novel device includes first metal inlet tubing 67 for conducting low-pressure steam from a suitable source (not shown), such as a coffee-making machine, to the inlet control valve 55. Second inlet tubing 69 connects the inlet control valve 55 with an inlet fitting 71 mounted in the inlet opening 41, for conducting steam from the inlet control valve 55 into the chamber 23. An outlet fitting 73 is mounted in the outlet opening 43. First outlet tubing 75 connects the outlet fitting 73 with the outlet control valve 57.

The backwall 35 has a bleeder port 77 therethrough somewhat down from its top edge and opposite the spaced portion of the shield 37. A second outlet tubing 79 is connected between the outlet control valve 57 and a bleeder port fitting 81 mounted in the bleeder port 77, and adapted to conduct steam and condensate from the outlet control valve 57 through the bleeder port 77 and to impinge the conducted steam and condensate against the spaced portion of the shield 37.

Figure 5:
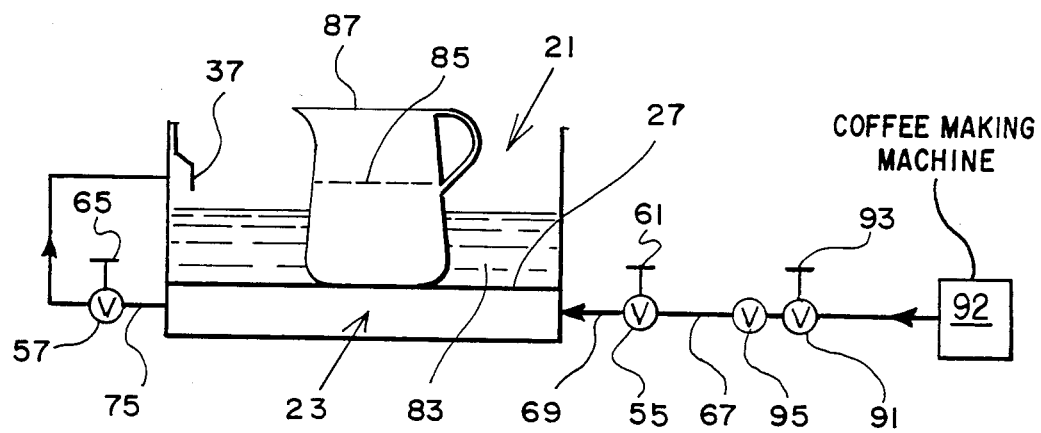
FIG. 5 is a schematic diagram of the novel device illustrating a preferred mode of operation of the preferred embodiment.

The operation of the novel device is relatively simple and a preferred mode of operation is now described with respect to the diagram shown in FIG. 5. Water 83 is placed in the tray 21. Low-pressure steam from a suitable source is conducted to the first inlet tubing 67. The inlet and outlet control valves 55 and 57 are opened relatively wide using the control knobs 61 and 65 respectively, permitting steam to pass through the valves 55 and 57 and the chamber 27 and to exhaust through the bleeder port 77 and impinge upon the shield 37. Ater the system is purged of air, the valves 55 and 57 are adjusted to a desired lower opening permitting a smaller amount of steam to pass through the system. Condensate in the system passes through the bleeder port 77 and, after impinging on the shield 37 drains into the tray 21. The steam passing through the chamber 32 heats the water 83 in the tray 21. Cold milk 85 in a container 87 is placed in the tray 21 and is rapidly heated by the hot water 83 to a desired temperature, without dilution by any of the condensate.

Steam passes continuously through the system and does not require constant attention or adjustment. Also, milk placed in the tray may be left there for different and irregular lengths of time without fear of boiling over. Hot steam condensate drains into the tray conserving some heat and compensating for water lost from the tray by evaporation. The system avoids the hazards of manually releasing low-pressure steam directly into a quantity of milk, as was done previously.

Furthermore, the operation of the novel device is compatible with normal service in a restaurant, and the novel device can be conveniently connected to a steam-heated coffee-making machine, such as the machine described in U.S. Pat. No. 4,137,833 to R. P. Yelloz, to tap off a supply of low pressure steam. As shown in FIGS. 1 and 5, steam from the coffee-making machine 92 is led from its connection, such as the manual valve 52 of the machine shown in the cited Yelloz patent, through a shut-off valve 91 having a manual control wheel 93 and then through a one-way check valve 95 into the first inlet tubing 67. Thus, the novel device can be mounted side-by-side with the coffee-making machine to provide two components of cafe'-au-lait.

The foregoing figures and descriptions thereof are provided as illustrative of some of the preferred embodiments of the concepts of this invention. While these embodiments represent what is regarded as the best modes for practicing this invention, they are not intended as delineating the scope of the invention which is set forth in the following claims.

What is claimed is.

1. A device for warming milk comprising a watertight open tray for holding hot water and containers of milk, said tray having a heat-conducting bottom wall, side walls attached to said bottom wall, and a shield attached to the inside of one of said side walls; a closed chamber under and contiguous with said tray, said bottom wall being common and integral with said tray and said chamber; first means for controllably introducing low-pressure steam into said chamber and second means for controllably transferring low-pressure steam from said chamber into an inlet for said tray and impinging said steam against said shield located above said inlet thereby forming liquid water which would assist heating said tray.

2. The device defined in claim 1 including a third means for connecting said first means to a source of low-pressure steam.

3. The device defined in claim 2 wherein said source of low-pressure steam is a coffee-making machine.

4. The device defined in claim 2 wherein said first means includes input tubing connecting said third means with said chamber, and a first valve installed in said input tubing for controlling the passage of said steam into said chamber.

5. The device defined in claim 4 wherein said second means includes transfer tubing connecting said chamber with said tray, and a second valve installed in said transfer tubing for controlling the passage of said steam into said tray.

6. The device defined in claim 5 wherein said shield is attached to the upper margin of said one side wall and a portion thereof extends downwardly in spaced relation with said one sidewall, and said transfer tubing connects with said tray at said inlet in said one sidewall opposite said spaced portion of said shield.

7. A device for warming milk and adapted to be operated in conjunction with a steam-heated coffee-making machine comprising a substantially rectangular watertight open tray for holding a quantity of hot water and at least one milk container, said tray having a heat-conducting bottom wall and upstanding side walls connected to and extending continuously around the periphery of said bottom wall; a closed chamber adapted for conducting steam therethrough, said bottom wall being common and integral with said tray and said chamber; first means for controllably introducing low-pressure steam from said coffee-making machine into said chamber; second means for controllably transferring steam from said chamber into an inlet for said tray; and a shield located above said inlet attached to a wall of said tray positioned in the path of steam issuing from said second means and further positioned so that condensate impinging thereon drains into said tray thereby further heating said tray.

8. The device defined in claim 7 wherein said first means includes a tubular means for conducting steam from said coffee-making machine, connection means between said coffee-making machine and said tubular means, and a valve in said tubular means for controlling the passage of steam therethrough.

9. The device defined in claim 8 wherein the control for said valve is at the front of said device and said shield is attached to the inside surface of the backwall of said tray.

10. The device defined in claim 9 wherein said shield is attached along the upper margin of said back wall of said tray and a lower portion of said shield extends downwardly towards the bottom of said tray, said lower portion of said shield being spaced from said back wall.

11. The device defined in claim 10 having a discharge end of said second means, wherein the discharge end of said second means terminates at said inlet in said back wall opposite said spaced lower portion of said shield.

* * * * *